United States Patent [19]
Endo et al.

[11] Patent Number: 5,956,533
[45] Date of Patent: Sep. 21, 1999

[54] ZOOM LENS CAMERA

[75] Inventors: Ken Endo; Ichiro Taguchi, both of Saitama-ken, Japan

[73] Assignee: Asahi Kogaku Kogyo Kabushiki Kaisha, Tokyo, Japan

[21] Appl. No.: 09/016,441

[22] Filed: Jan. 30, 1998

[30] Foreign Application Priority Data

Jan. 31, 1997 [JP] Japan .................................. 9-019038

[51] Int. Cl.⁶ .................................................. G03B 17/00

[52] U.S. Cl. ............................................. 396/85; 396/72

[58] Field of Search ........................................ 396/72, 85

[56] References Cited

U.S. PATENT DOCUMENTS

| | | | |
|---|---|---|---|
| 5,115,348 | 5/1992 | Notagashira | 396/85 |
| 5,349,408 | 9/1994 | Nomura et al. | 396/85 |
| 5,758,207 | 5/1998 | Endoh | 396/85 |

*Primary Examiner*—Russell Adams
*Attorney, Agent, or Firm*—Greenblum & Bernstein, P.L.C.

[57] ABSTRACT

A zoom lens camera having a film feeding mechanism for a self advancing film cartridge, a zoom lens barrel, a motor for driving the lens barrel, a behind-film space provided between the film feeding surface and the back plate of the camera body, and a reduction gear train which transmits the rotation of the motor to the zoom lens barrel; a part of the reduction gear train is positioned in the behind-film space.

11 Claims, 8 Drawing Sheets

ZOOM LENS CAMERA

BACKGROUND OF THE INVENTION

1. Field of the Invention

The present invention relates to a APS (advanced photo system) type zoom lens camera which utilizes a self-advancing film cartridge.

2. Description of the Related Art

In the prior art it is known for a camera to have a rear cover that can open and close allowing the loading and unloading of a film cartridge. Such a camera usually requires an initial amount of film to be pulled out from the film cartridge in advance before loading the film into the camera, so that the start (tongue) of the film reaches the vicinity of a film-winding spool, and the rear most part of the camera is formed as the rear cover. Due to such a structure, the rear cover is provided with members relating to supporting the film, such as a film pressure plate to obtain a flat plane of film, or film guide rollers. The space between the non-photographing side (the opposite side to that to be exposed) of the film and the rear cover is a vacant space except for existence of the film pressure plate or the guide rollers. However, it was impossible to provide any functional members within this space as it could possibly interfere with the film, hindering the insertion and removal of the film. Conversely, in a compact camera, the increase of functions and the pursuit of further miniaturization has brought pressure on inventors to utilize every amount of space possible, even the most insignificant amount of space. For example, if it is possible to provide a functional member in the space behind the film feeding surface, it would contribute to good utilization of space.

In a new camera system "APS" (Advanced Photo System), wherein a self-advancing film cartridge is used the film is loaded into the cylindrical cartridge compartment without extracting any film out in advance. An opening cover of the cartridge compartment is provided, for example, on the bottom of the camera body. A film feeding space is provided inside the camera body, and when the film cartridge is loaded, the film is carried out through this film feeding space toward the spool. Therefore opening or closing of the rear cover of the camera body is not required for a APS type camera.

SUMMARY OF THE INVENTION

It is an object of the present invention to provide a zoom lens camera which accomplishes the miniaturization thereof by utilizing every possible vacant space inside the camera.

Accordingly, the present invention takes advantage of a camera using a self-feeding type of film cartridge which feeds the film from the cartridge by the rotational driving of a spool which the film is wound around. Such type of camera does not require opening and closing operations of the rear cover of the camera for the loading and unloading of film. Thus any kind of structural member can be positioned in the rear of the film feeding surface, namely in the "useless space" which has, in the past, been impossible to utilize.

To achieve the object mentioned above, according to the present invention, there is provided a zoom lens camera comprising a film feeding mechanism for film self feeding from a film cartridge into the main body of the camera by the rotational driving of a spool inside the film cartridge; a zoom lens barrel to vary focal length by forwardly and rearwardly moving the zoom lens in the optical axis direction; a motor to drive the zoom lens barrel; and a reduction gear train, which is pivotally supported by the wall of the film-feeding passage, to transmit rotation of the motor to the zoom lens barrel; in which a part of the reduction gear train is positioned separate from the main part of the film-feeding passage in the rear of the film feeding surface in the optical axis direction of the camera.

With this structure, when the motor is positioned in the front of the film feeding surface, the rotatable shaft of the motor protrudes beyond the film feeding surface by passing above or under the film in order to drive the reduction gear train. The final gear on the side of the zoom lens barrel to rotate the zoom lens barrel is generally positioned in the front of the film feeding surface, therefore part of the reduction gear train is positioned in the front of the film feeding surface. In such a case, there may be a driving connection means provided to transmit the rotation of the reduction gear train in the rear of the film feeding surface to the reduction gear train in the front of the film feeding surface. The driving connection means may be provided with a shaft member with gears at each end elongated in the optical axis direction of the camera, passing above or under the film.

Preferably, in order to achieve good space utilization, the internal structure of the camera body contains: cylindrical film cartridge and film-winding compartments, a box-shaped space between these compartments which constitutes a film-feeding section, a reduction gear train which is supported via its pivots by a structure on the rear side of the film-feeding section. The main body of the film-feeding section and the section of the mother plate which pivotally supports the reduction gear train are constructed as two separate members, facilitating assembly.

The present disclosure relates to subject matter contained in Japanese Patent Application No. 09-19038 (filed on Jan. 31, 1997) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
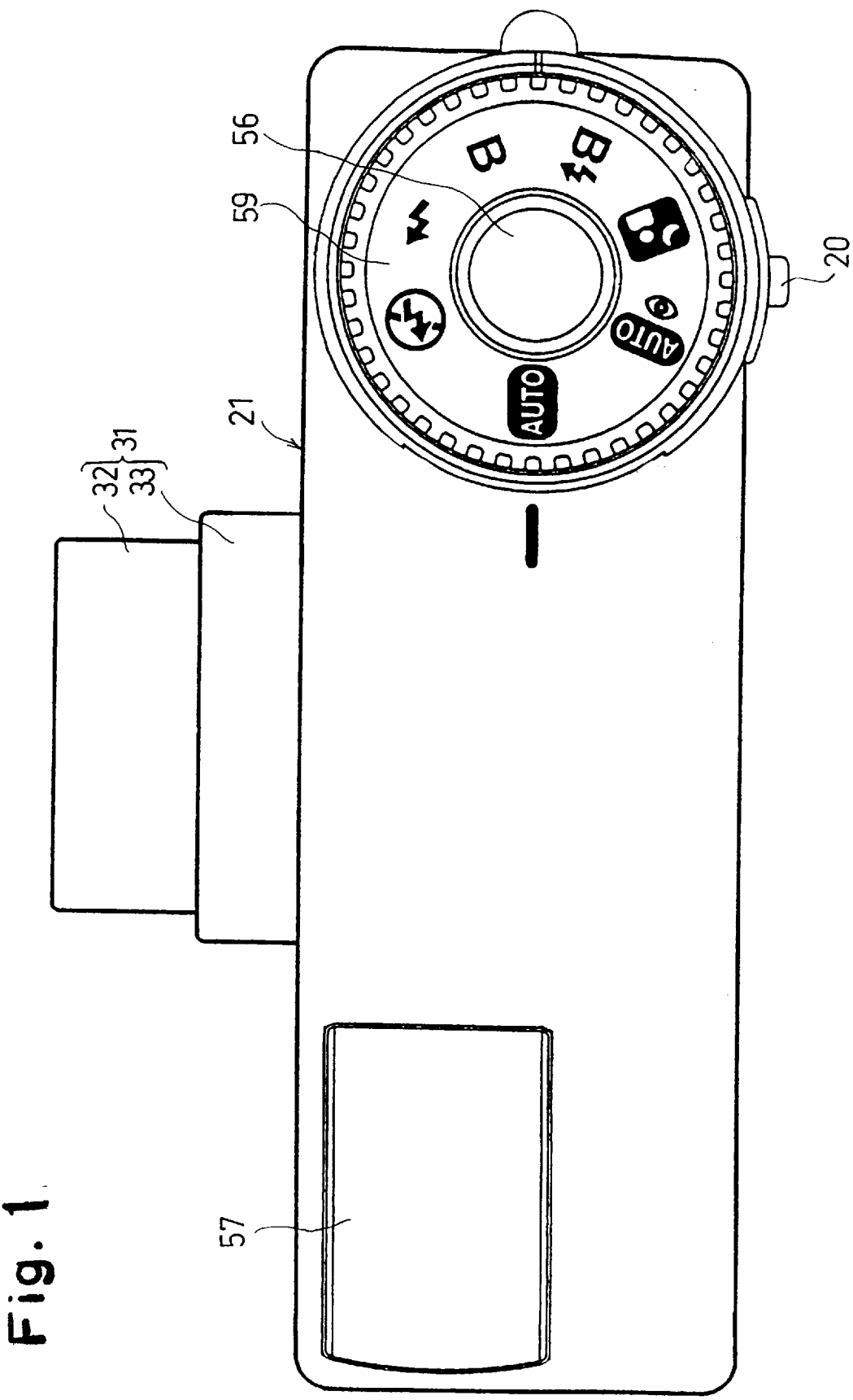
FIG. 1 is a plan view of a zoom lens camera according to the present invention.
Figure 3:
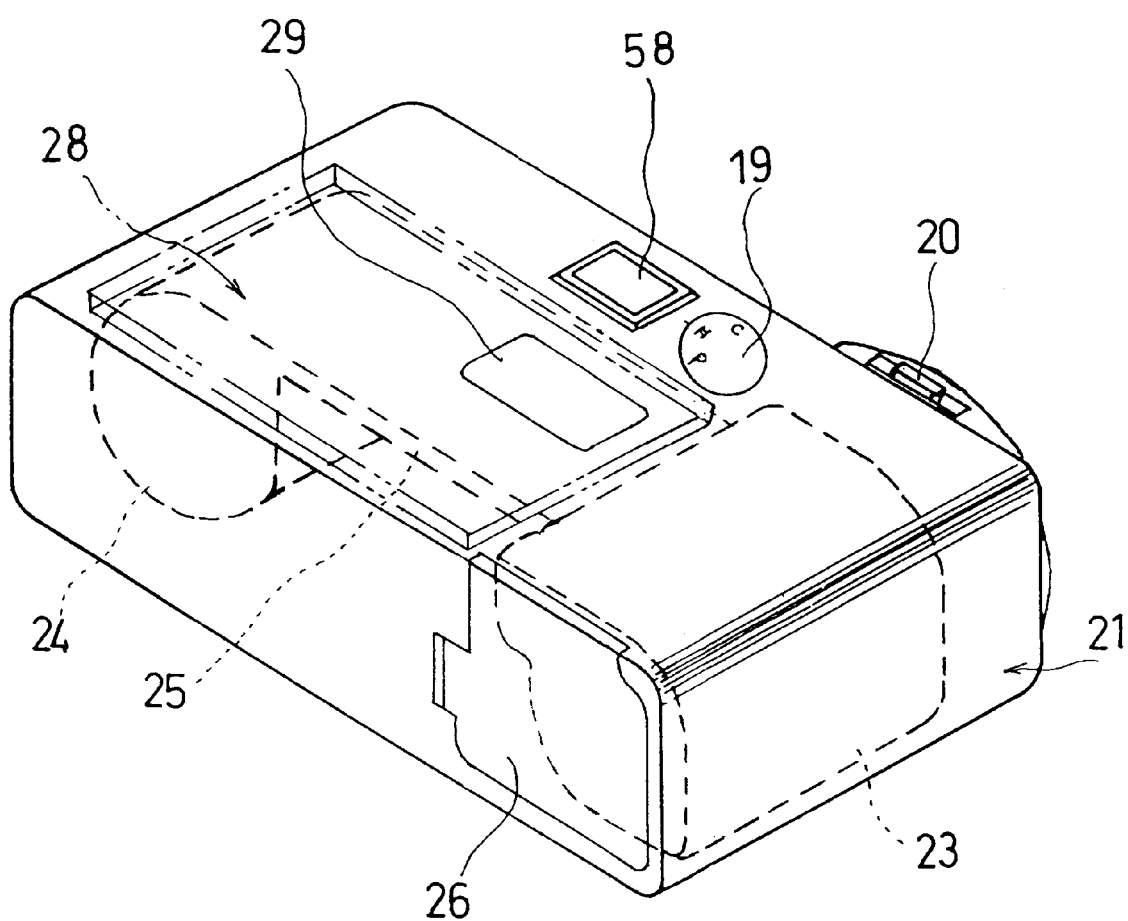
FIG. 3 is a perspective view as viewed from the underside of the zoom lens camera according to the present invention.

The present invention will now be described with reference to accompanying drawings. FIGS. 1 and 3 show external appearances of an embodiment of the zoom lens camera according to the present invention using a self-advancing film cartridge. A camera is provided with a zoom lens barrel 31 in the center at the front of the camera body 21. The zoom lens barrel 31 comprises a first movable lens barrel 32 and a second movable lens barrel 33, so that the lens barrels 32 and 33 move in forward and rearward directions to vary the focal length. A zoom lever 20 is provided at the rear of the camera body 21 to carry out the zooming operation. The zoom lever 20 is biased to a neutral position by a torsion spring (not shown) to be positioned at the center of movement of the lever. When an operator moves the zoom lever 20 in one direction from this neutral position, the zoom lens barrel 31 moves toward the WIDE (wide-angle) position, and when the operator moves the zoom lever 20 in the opposite direction, the zoom lens barrel 31 moves toward the TELE (telephoto) position. The camera body 21 is further provided with a photographic mode setting dial 59, a shutter release button 56, a pop-up type strobe (electronic flash) 57 and an eyepiece of a viewfinder 58 (FIG. 3).

Figure 2:
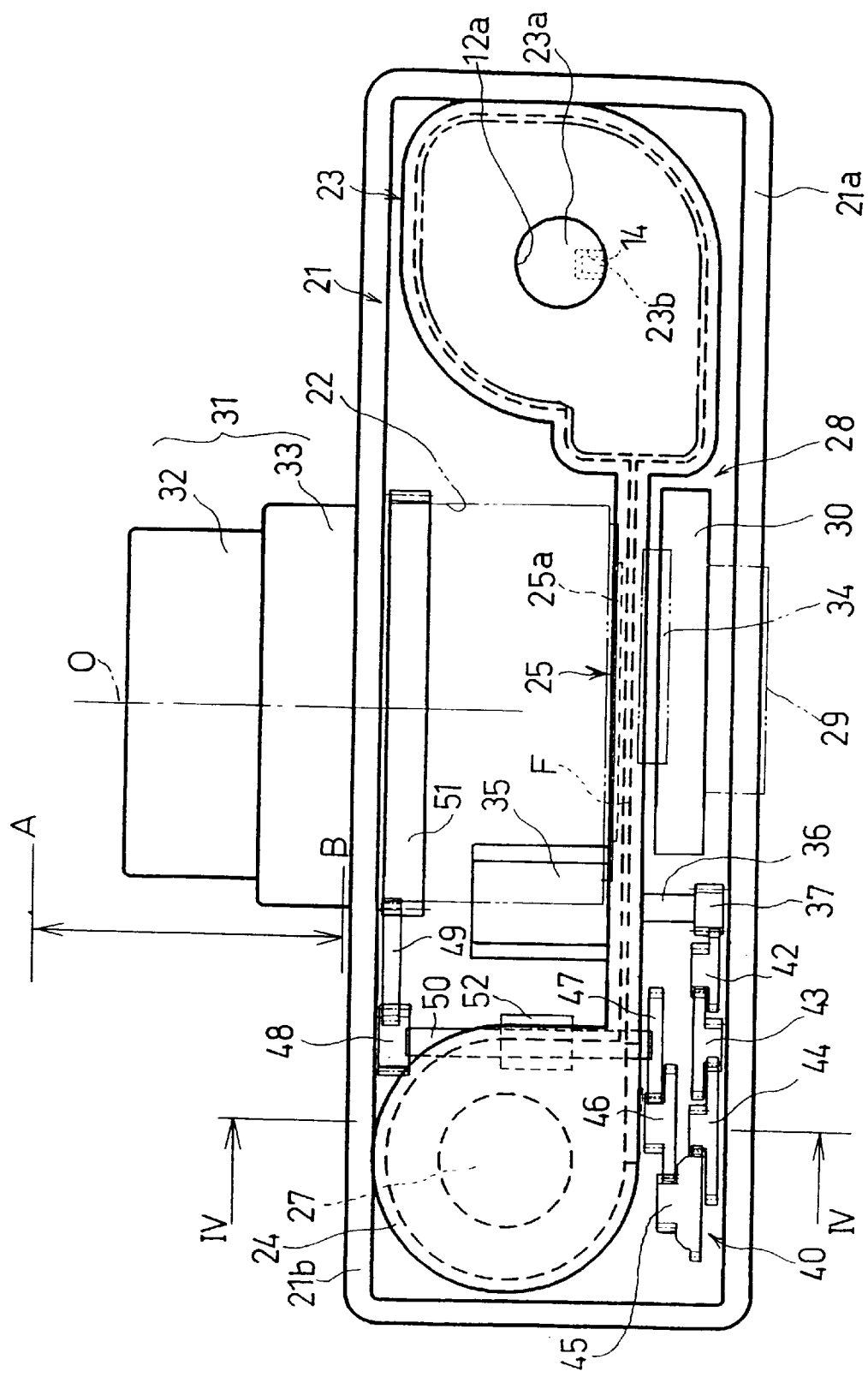
FIG. 2 is a plan view showing an inner structure of the zoom lens camera according to the present invention.

FIG. 2 is a plan view illustrating an inner structure of the camera. The zoom lens barrel 31 moves forwardly and rearwardly along the optical axis, so that the front edge of the first lens barrel 32 moves between A and B of FIG. 2. When the front edge of the first lens barrel 32 is positioned at B, the zoom lens barrel 31 is at a retracted state, and when the front edge of the first lens barrel 32 is positioned at A, the zoom lens barrel 31 is at the TELE extremity position. The zoom lens barrel 31 in FIG. 2 is an intermediate state in which a predetermined amount of lens feeding is made.

The camera body 21 is provided with a lens barrel storage space 22 to store the zoom lens barrel 31. In FIG. 2, when viewed lengthwise, the lens barrel storage space 22 is positioned at the center of the camera body, and a film cartridge compartment 23 is positioned on the right, and a film-winding spool compartment 24 is positioned on the left. The film-winding spool compartment 24 is provided with a spool 27 in the form of cylindrical shape to wind the film F. The film cartridge compartment 23 and the film-winding spool compartment 24 are connected by a film-feeding passage 25 which is provided in the rear of the lens barrel storage space 22. The hollow part of the film-feeding passage 25 is formed so that the film F is fed by maintaining the flatness thereof. The film-feeding passage 25 is provided with an aperture 25a in front thereof, which is located at the position in the rear of the lens barrel storage space (photographic optical path) 22, so that the film F is exposed through the aperture 25a when a shutter is released.

A cartridge compartment lid 26 with locking mechanism is provided at the bottom of the camera body 21 (see FIG. 3). The compartment lid 26 opens and closes the film cartridge compartment 23 to load and unload the film cartridge 10 (see FIG. 7) in the film cartridge compartment 23. When the compartment lid 26 is closed and locked, the film-winding spool compartment 24 and the film-feeding passage 25 is in a light-shielded state.

After the film cartridge 10 is loaded into the film cartridge compartment 23, the film F is fed by a feeding mechanism provided inside the camera body 21. The film cartridge 10 and the film feeding mechanism will be briefly discussed as follows.

Figure 7:
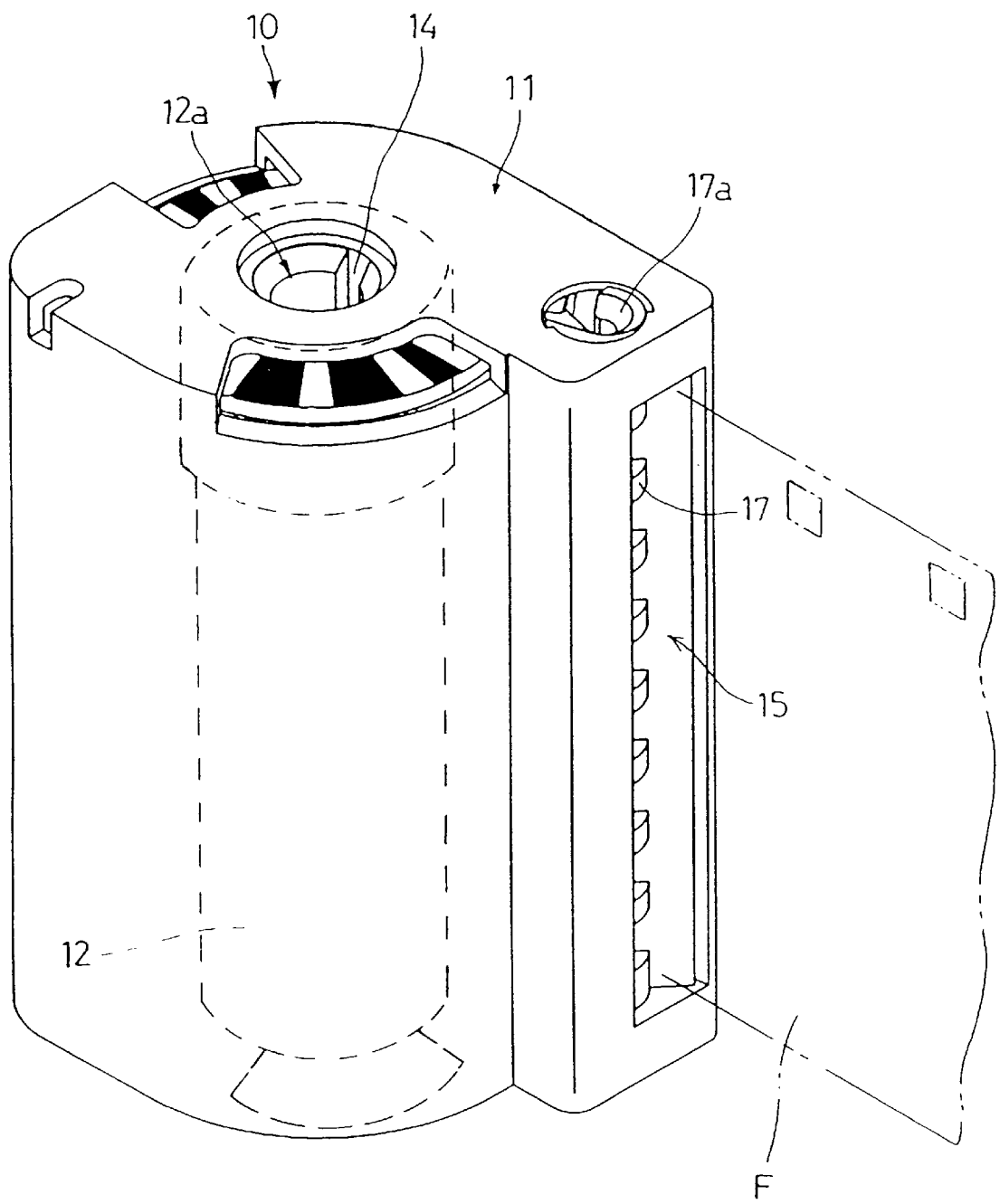
FIG. 7 is a perspective view of a film cartridge to be loaded in the zoom lens camera according to the present invention.

As illustrated in FIG. 7, the film cartridge 10 has a housing 11 of cylindrical shape in which a cartridge spool 12 is rotatively provided. The film F is wound around the cartridge spool 12. One end of the cartridge spool 12 has a spool driving shaft receiving hole 12a in a cylindrical shape, which faces to one end (top or bottom) of the housing 11 and has a key groove 14 formed on the inner peripheral all thereof. A film feed opening 15 is provided along a longitudinal side of the housing 11. The film feed opening 15 is provided with a light-shielding door 17 which shields the film feeding opening 15 in order to prevent the film F from being exposed. The light-shielding door 17 is a plate-shaped member rotatively supported inside the housing 11 by a light-shielding door actuating pivot 17a, so that the film feed opening 15 is open or closed by rotation of this pivot.

When the film cartridge 10 is loaded inside the film cartridge compartment 23, the spool driving shaft receiving hole 12a is engaged with a spool driving shaft 23a, so that a protrusion 23b provided on the spool driving shaft 23a is engaged with the key groove 14. The engagement of the spool driving shaft receiving hole 12 with the spool driving shaft 23a does not allow the relative rotation therebetween. In this state that the film cartridge 10 has just been loaded, the film F is still stored inside the housing 11, thus the film F is firstly forwarded by driving (rotating) the cartridge spool 12. A light-shielding door open/close mechanism (not shown) is provided inside the film cartridge compartment 23, which is interlocked with the locking action of the compartment lid 26. When the compartment lid 26 is locked in a closed state, the light-shielding door actuating pivot 17a rotates to open the light-shielding door 17, thus the film F can move in and out through the film feed opening 15. Then the film feeding motor (not shown) is actuated, driving the spool driving shaft 23a to rotate the cartridge spool 12 in the direction of feeding of the film F toward the film-feeding passage 25 (forward direction). When a predetermined amount of the start (tongue) of the film F is wound around the spool 27, the initial feeding of the film F stops, and the camera is in a stand-by state for photographing.

When the shutter release operation is carried out, the film F is exposed through the aperture frame 25a. After completion of the exposure operation, the spool 27 is driven, feeding the film F by the amount of one frame toward the spool 27. The photographing operation is repeatedly carried out according to the above procedure until reaching a predetermined number of frames to be photographed, then the cartridge spool 12 is driven in the reverse direction to rewind the film F around the cartridge spool 12. When the film F is completely rewound inside the housing 11, the lock of the compartment lid 26 can then be unlocked, and together with this unlocking operation (before the lid 26 opens) the light-shielding door 17 is closed. So, both the loading and unloading operations of the film cartridge 10 can be carried out without exposing the film F. Accordingly, the camera body 21 requires only a small opening for the storage compartment 26, instead of a large rear cover as in the prior art.

The internal structure of the camera body 21 will now be discussed referring back to FIG. 2. The film cartridge compartment 23 occupies a large space almost reaching the rear plate 21a of the camera body 21. Conversely, a relatively wider space exists behind the film-winding spool compartment 24 as well as behind the film-feeding passage 25, between the rear plate 21a. This 'wider' space will hereinafter be referred as the 'behind-film space' 28. Since the camera body 21 accepts the film cartridge 10 from its longitudinal direction, the exterior of the camera body 21 is formed as an enclosure box without any opening other than the compartment lid 26 provided on the underside thereof. In other words, the rear plate 21a of the camera body 21 will not be opened or closed. In addition, a flat plane of the film F can be obtained inside the film-feeding passage 25, therefore it is possible to place any structural or functional members other than that for supporting film in the behind-film space 28.

In the behind-film space 28, an LCD (liquid crystal display) 29 and a circuit board 30 are provided in the vicinity of the center of the camera. An opening (transparent window) is provided on the back plate 21a to expose the display surface of the LCD 29, through which the display can be observed from rear of the camera. The reverse side (opposite to the exposed side) of the film F has a magnetic layer in the APS system, and a corresponding magnetic recording apparatus 34 is provided in the behind-film space 28, which records various photographic information on the magnetic layer. The information recorded by the magnetic recording apparatus 34 will be the date, time, photographic condition, picture size information, etc. For example, the camera can select the picture size according to the rotation of the picture size selection dial 19 (see FIG. 3), among a wide-size standard picture size ("Hi-vision" size), a narrow picture size by cutting both portions of the right and left sides of the standard picture ("Classic" size), and a wider picture size by cutting both portions of the top and bottom sides of the standard picture ("Panorama" size). Such a selection of picture size is carried out, not by placing members to shield the light along the photographing optical axis to adjust the portion to be exposed, but by determining the trimming portion of the exposed film, after being exposed in the standard picture size. Therefore each frame of the film F has the magnetic information which records the selected picture size of each frame of the film F.

Figure 4:
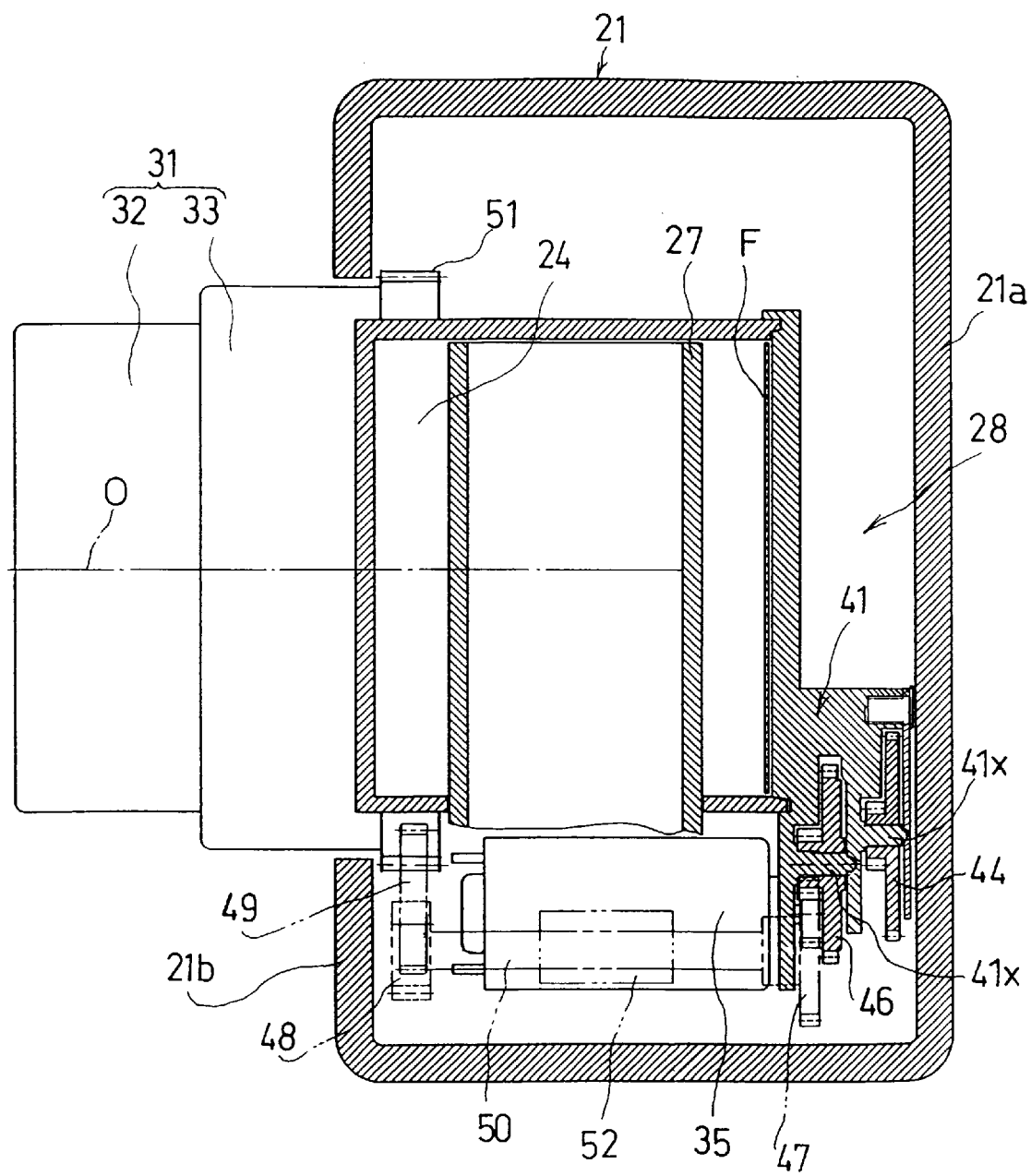
FIG. 4 is a sectional view cut along a line IV—IV of FIG. 2.

As an element (driving source) of the driving mechanism of the zoom lens barrel 31, a zoom motor 35 is provided inside the camera body 21. The zoom motor 35 is connected to a control circuit of the camera, so that when the zoom lever 20 is at the neutral position, the zoom motor 35 will not rotate, and when the operator slides the zoom lever 20 toward the TELE or WIDE position, the zoom motor 35 will rotate in the forward or reverse direction. As illustrated in FIGS. 2 and 4, the zoom motor 35 is mounted in front of the feeding surface of the film F (the film-feeding passage 25) in the camera body 21. The zoom motor 35 has an output shaft 36 extending toward the rear of the camera body 21 parallel to the optical axis O of the zoom lens barrel 31. The output shaft 36 protrusively extends toward the behind-film space 28, by passing under the film-feeding passage 25, as shown in FIG. 2 and 4. A pinion 37 is provided at the end of the output shaft 36 to transmit the driving force to a zoom lens driving gear train (reduction gear train) 40.

A separate mother plate (rear plate) 41 is provided behind and attached to the film-winding spool compartment 24 and the film-feeding passage 25, facing to the behind-film space 28. A plurality of rotatable shafts 41x protruding toward the rear of the camera are provided at the bottom of the mother plate 41. The plurality of rotative shafts 41x, as the pivots, supports a plurality of gears which serves as the members of the zoom lens driving gear train 40. The other plate 41 has parallel plates to be able to partially support the double gears as seen in FIG. 4.

Figure 5:
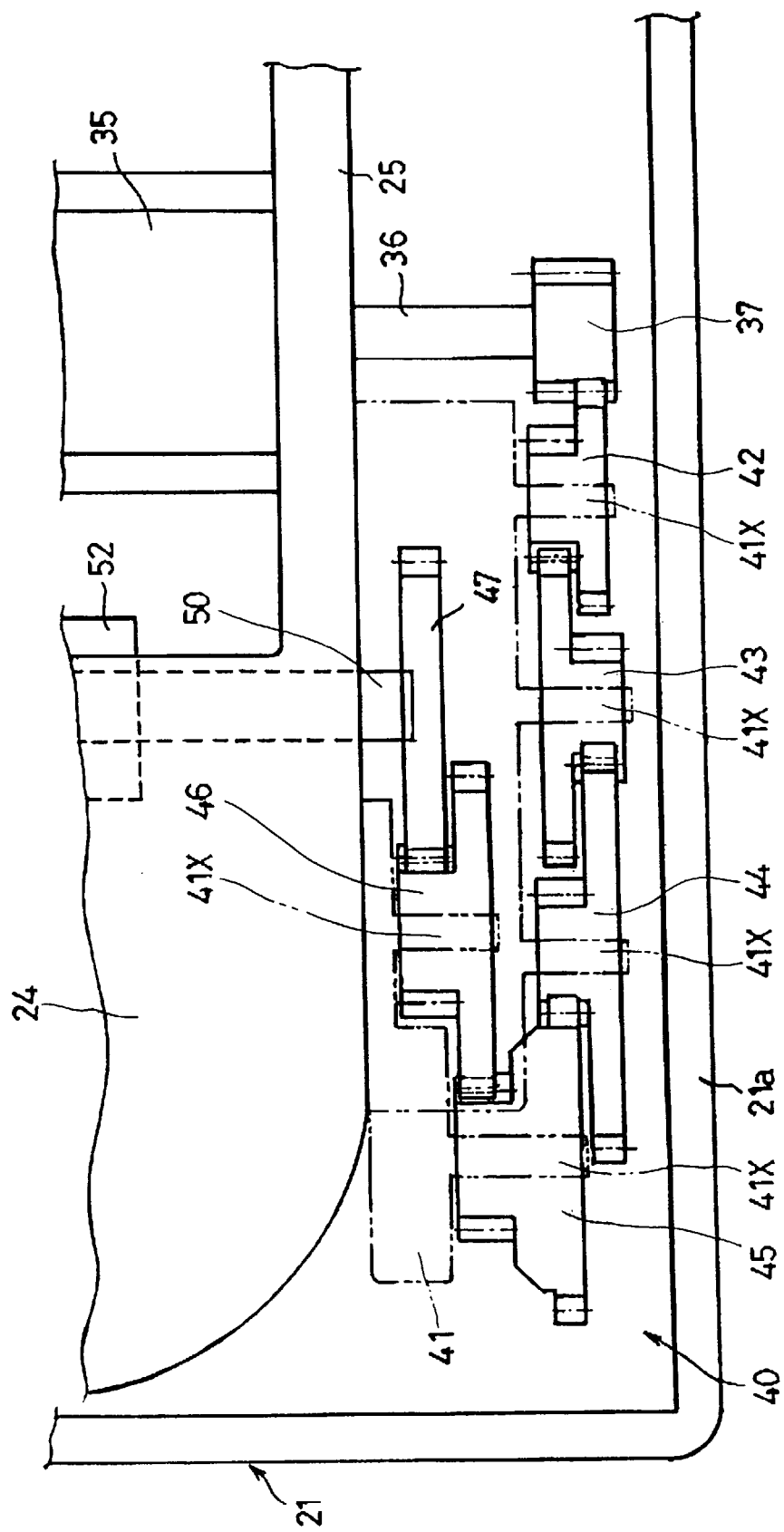
FIG. 5 is an enlarged plan view around a zoom gear train of the zoom lens camera.
Figure 6:
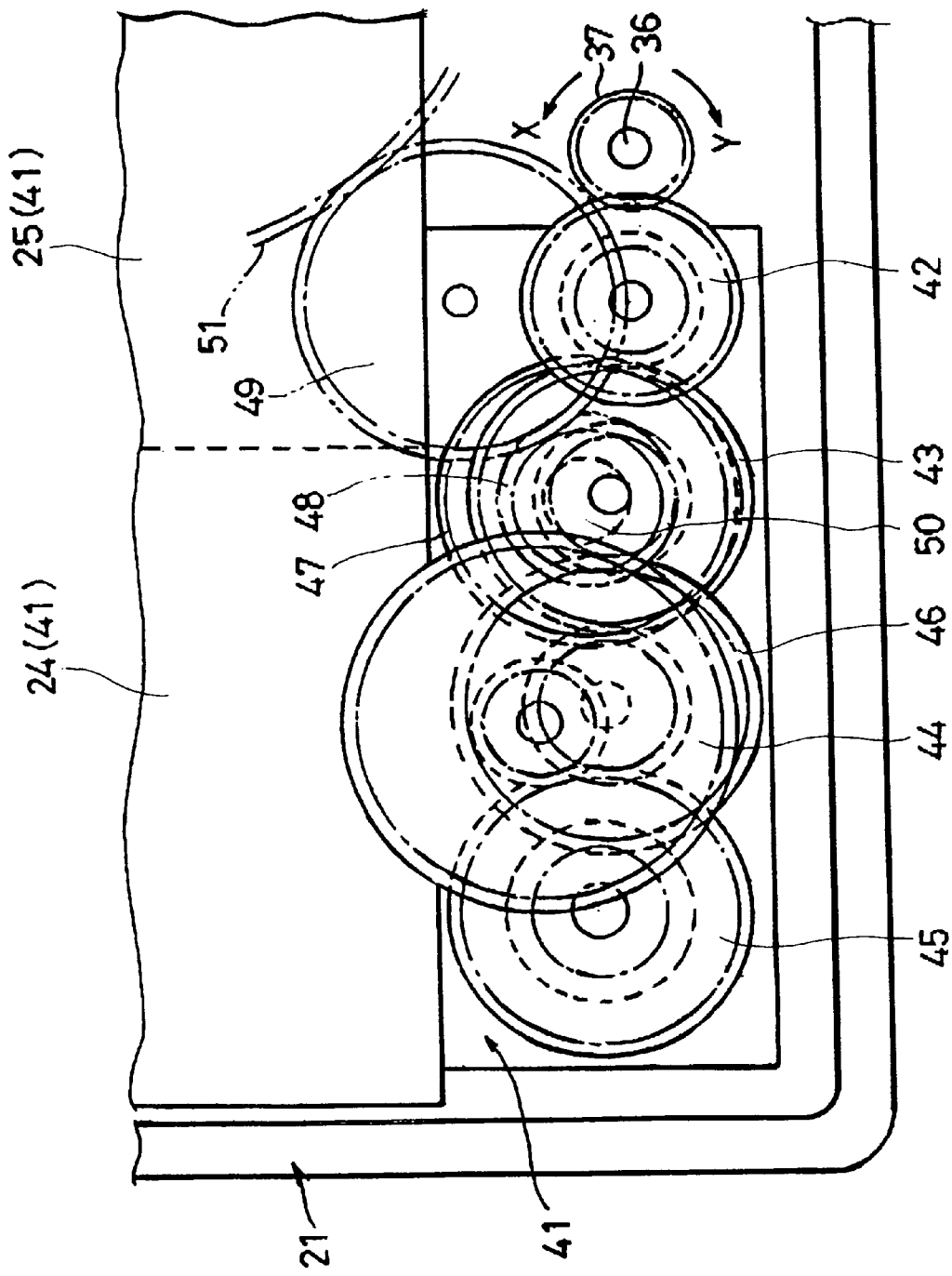
FIG. 6 is a rear elevational view as viewed through the gear train of FIG. 5 from the rear of the zoom lens camera.

FIGS. 5 and 6 are expanded views of the zoom lens driving gear train 40. There is a first transmission gear 42 as a double gear on the right of FIGS. 5 and 6, and the larger gear of this double first transmission gear 42 is engaged with the pinion gear 37. The first transmission gear 42 is followed by a second transmission gear 43, a third transmission gear 44, fourth transmission gear 45 and a fifth transmission gear 46, each of which is a double gear consisting a larger gear and a smaller gear having a common axis. The smaller gear of each transmission gear (double gear) is engaged with a larger gear of an adjacent transmission gear (double gear) to obtain the predetermined reduction gear ratio of the zoom lens driving gear train 40 as a whole.

The smaller gear of the fifth transmission gear 46 is engaged with a spur gear 47. The spur gear 47 is a gear fixed on one end of a shaft 50 which extends from the behind-film space 28 toward the front of the camera body 21 passing under the film-winding spool compartment 24 (the film-feeding passage 25), so that the shaft 50 rotates integral with the spur gear 47. Front end of the shaft 50 extends in the vicinity of a front panel 21b of the camera body 21, and a shaft gear 48 is fixed on the front end of the shaft 50 (closer to the front panel 21b in FIG. 4). Thus the spur gear 47 and the shaft gear 48 always rotate together. The shaft gear 48 is engaged with a transmission gear 49 which is pivotally attached to the front panel 21b of the camera body 21, and the transmission gear 49 is engaged with a lens barrel driving gear 51. The lens barrel driving gear 51 rotates in the forward and reverse directions in order to serve to move the zoom lens barrel 31 along the optical axis O in the forward and rearward directions.

The shaft 50 is provided with a clutch mechanism 52 comprising a slip type of clutch which is known per se, namely the clutch which disengages transmission of driving force when a torque exceeding a predetermined amount is applied thereto. If any part of the zoom lens barrel 31 is clogged with foreign articles and an operation error occurs, the clutch mechanism 52 disengages (namely, disconnects driving force) the zoom lens driving gear train 40 from the zoom lens barrel 31 in order to protect the gears from being damaged.

During assembly of the camera in the present embodiment, the first through fifth transmission gears 42–46 are firstly attached to the mother plate 41, then the mother plate 41 itself is attached to behind the film-winding spool compartment 24 and the film-feeding passage 25. The mother plate 41 of the gear train also serves as a light shielding member, and when the mother plate 41 is attached, the inside of the film-winding spool compartment 24 and behind the film-feeding passage 25 become a light shielding box. Since the gear train itself has been assembled to the mother plate 41 before attachment of the mother plate 41 to the film-winding spool compartment 24 and the film-feeding passage 25, assembly is facilitated. In addition, since each gear of the zoom lens driving gear train 40 is a spur gear, the structure thereof can be simplified at low cost.

For example, "forward rotation" is defined as the direction of rotation of the zoom motor 35 which is actuated when the zoom lever 20 is slid toward TELE, which is illustrated by an arrow X in FIG. 6. The rotation of the pinion 37 in the direction X (forward rotation) is transmitted by reducing the speed through the zoom lens driving gear train 40, eventually the lens barrel driving gear 51 rotates counterclockwise in FIG. 6 and forwardly moving the zoom lens barrel 31 in the optical axis direction. As the zoom lever 20 is biased to be at the neutral position, when the operator let the zoom lever 20 loose, the zoom lever 20 returns to the neutral position to stop the zoom motor 35. Conversely, when the zoom lever 20 is slid toward WIDE, the zoom motor 35 rotates in the "reverse rotation," of which direction is illustrated by an arrow Y in FIG. 6. The rotation of the pinion 37 in the Y direction (reverse rotation) is transmitted by reducing the speed through the zoom lens driving gear train 40, eventually the lens barrel driving gear 51 rotates clockwise in FIG. 6 with rearwardly moving the zoom lens barrel 31 in the optical axis direction.

As described above, since the zoom lens driving gear train 40 is positioned inside the behind-film space 28 which otherwise has a tendency to be treated as "useless (dead) space", a more efficient use of space can be accomplished. Thus the space where a zoom gear train has been positioned in the prior art may be used as the space for other members. In addition, as above described, since it is possible to firstly assemble the zoom lens driving gear train 40 to the mother plate 41, assembly is facilitated.

Figure 8:
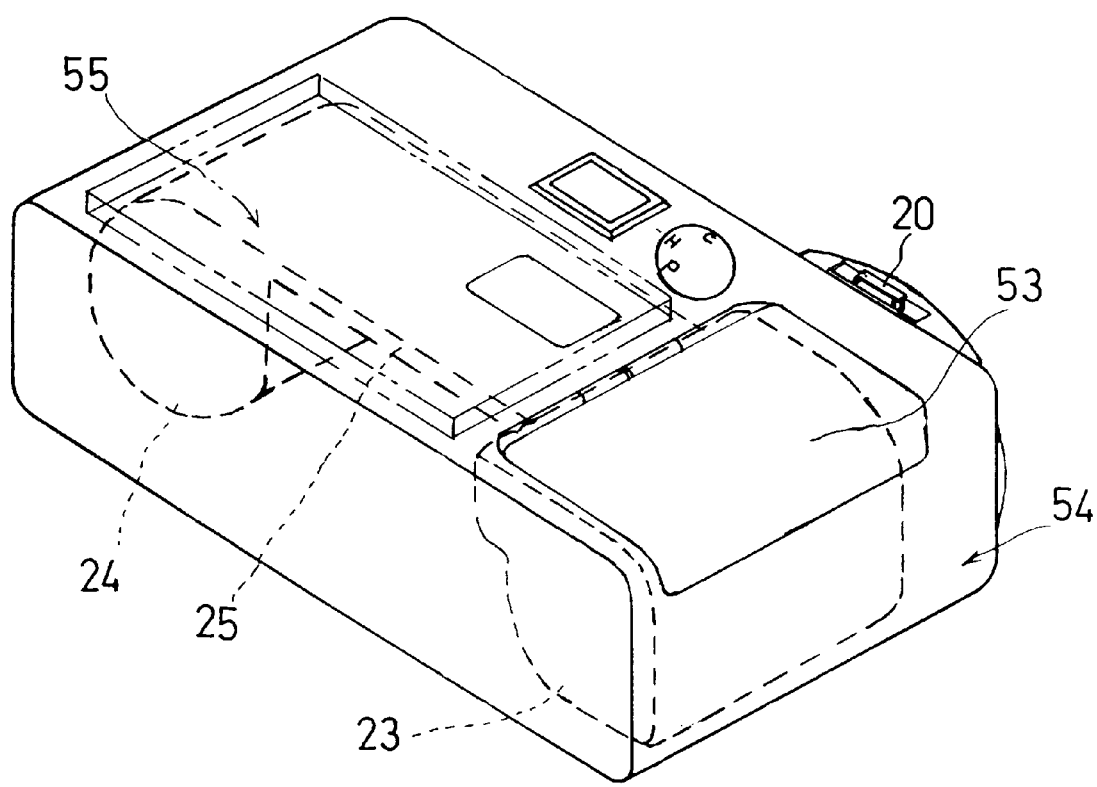
FIG. 8 is a perspective view as viewed from the underside of the zoom lens camera having a loading and unloading part of the film cartridge in the rear thereof.

FIG. 8 illustrates an embodiment of the present invention in which a compartment lid 53 to open and close the film cartridge compartment 23 is provided on the rear plate of the camera body 54. The inner structure of the camera body 54 is almost the same as that of the foregoing embodiment. Since the compartment lid 53 opens or closes only a part of the rear plate of the camera body 54, like the case of the foregoing embodiment, it is possible to position the zoom lens driving gear train in the behind-film space 55.

As described above, according to the present invention, a part of the zoom lens gear train is positioned in the space between the film feeding surface and the rear plate of the camera body, which has been difficult to place any kind of member in the prior art, namely the camera of which rear cover should be open or closed for film loading. Therefore the size of the zoom lens camera is minimized.

The present invention is not limited to the embodiments as above described. For example, although the mother plate which pivotally supports the zoom lens driving gear train serves as a part of the light-shielding member, the camera body itself can also be formed as a box to shield the light. In addition, the output shaft of the zoom motor or the other shafts elongated in the optical axis may be positioned above the film. Further, although a number of small double gears for effective reduction of the speed, it is of course possible to use a larger sized gears to simplify the structure.

What is claimed is:

1. A zoom lens camera comprising:
    a film feeding mechanism for a self advancing film cartridge having a spool on which a film is wound, said mechanism feeding a film by driving said spool of said film cartridge;
    a zoom lens barrel which varies the focal length by forwardly and rearwardly moving said zoom lens barrel in an optical axis direction;
    a motor for driving said zoom lens barrel;
    a behind-film space provided between the film feeding surface and a back plate of the camera body of said zoom lens camera; and
    a reduction gear train which transmits the rotation of said motor to said zoom lens barrel, a part of said reduction gear train being positioned in said behind-film space.

2. The zoom lens camera according to claim 1, wherein said motor is positioned in the front of said film feeding surface, and an output shaft of said motor rearwardly protruding beyond said film feeding surface by passing above or under said film.

3. The zoom lens camera according to claim 1, wherein a part of said reduction gear train is also provided in the front of said film feeding surface, said camera further comprising a driving connection means to transmit the rotation of said part of reduction gear train in the rear of said film feeding surface to said part of reduction gear train in the front of said film feeding surface.

4. The zoom lens camera according to claim 3, wherein said driving connection means comprises a shaft member having gears on both ends, said shaft member extending in the optical axis direction of said camera by passing above or under said film.

5. The zoom lens camera according to claim 1, wherein said camera body comprises a film cartridge compartment, a film-winding spool compartment and a film-feeding passage to connect said film cartridge compartment and said film-winding spool compartment, said reduction gear train being pivotally supported by a wall of said film-feeding passage on a side of a rear plate of said camera.

6. The zoom lens camera according to claim 5, wherein said wall for supporting said reduction gear train comprises a mother plate separate from a main part of said film-feeding passage, said mother plate and said main part of said film-feeding passage comprising said film-feeding passage as a whole.

7. A zoom lens camera comprising:
    a film cartridge compartment in which a self advancing film cartridge is inserted, said cartridge having a spool on which a film is wound, said film being fed by driving said spool;
    a film-winding spool compartment;
    a film-feeding passage to connect said film cartridge compartment and said film-winding spool compartment;
    a zoom lens barrel which varies the focal length by forwardly and rearwardly moving in an optical axis direction;
    a motor for driving said zoom lens barrel;
    a behind-film space provided between said film-feeding passage and a back plate of the camera body of said zoom lens camera; and
    a reduction gear train which transmits rotation of said motor to said zoom lens barrel, a part of said reduction gear train being positioned in said behind-film space.

8. The zoom lens camera according to claim 7, wherein said motor is positioned in the front of said film-feeding passage, and an output shaft of said motor rearwardly protruding beyond said film feeding surface by passing above or under said film.

9. The zoom lens camera according to claim 7, wherein a part of said reduction gear train is also provided in the front of said film-feeding passage, said camera further comprising a driving connection means to transmit rotation of said part of reduction gear train in the rear of said film-feeding passage to said part of reduction gear train in the front of said film-feeding passage.

10. The zoom lens camera according to claim 9, wherein said driving connection means comprises a shaft member having gears on both ends, said shaft member extending in the optical axis direction of said camera by passing above or under said film-feeding passage.

11. The zoom lens camera according to claim 5, wherein said wall for supporting said reduction gear train comprises a mother plate separate from a main part of said film-feeding passage, said mother plate and said main part of said film-feeding passage comprising said film-feeding passage as a whole.

* * * * *